United States Patent [19]
Marhofer et al.

[11] Patent Number: 5,932,123
[45] Date of Patent: Aug. 3, 1999

[54] MOBILE AUTOMATED PIPELINE WELDING AND QUALITY CONTROL SYSTEM

[75] Inventors: William E. Marhofer, Beaumont, Canada; Shell Sanford, Jacksonville, Tex.; John Craig; Tim Flynn, both of Edmonton, Canada

[73] Assignee: O.J. Pipelines Corp., Nisku, Canada

[21] Appl. No.: 08/818,198

[22] Filed: Mar. 14, 1997

[30] Foreign Application Priority Data

Jan. 13, 1997 [CA] Canada ................................. 2194937

[51] Int. Cl.$^6$ .................................................. B23K 9/12
[52] U.S. Cl. .............................. 219/130.01; 219/125.11; 219/125.12; 219/137.71
[58] Field of Search ................... 219/130.01, 124.34, 219/125.1, 125.11, 125.12, 130.31, 130.32, 130.33, 130.5, 137.7, 137.71

[56] References Cited

U.S. PATENT DOCUMENTS

| | | | |
|---|---|---|---|
| 3,555,239 | 1/1971 | Kerth | 219/124.34 |
| 3,581,050 | 5/1971 | Brown et al. | 219/137.7 |
| 3,582,967 | 6/1971 | Beckman | 219/109 |
| 3,689,734 | 9/1972 | Burley et al. | 219/130.32 |
| 3,818,176 | 6/1974 | Brown | 219/125.12 |
| 4,019,016 | 4/1977 | Friedman et al. . | |
| 4,144,992 | 3/1979 | Omae et al. | 228/102 |
| 4,163,886 | 8/1979 | Omae et al. . | |
| 4,283,617 | 8/1981 | Merrick et al. . | |
| 4,373,125 | 2/1983 | Kazlauskas et al. | 219/60 A |
| 4,375,026 | 2/1983 | Kearney | 219/130.01 |
| 4,734,640 | 3/1988 | Kitahori et al. | 324/127 |
| 5,278,390 | 1/1994 | Blankenship | 219/125.1 |
| 5,397,872 | 3/1995 | Baker et al. | 219/109 |
| 5,534,676 | 7/1996 | Rinaldi et al. | 319/124.34 |
| 5,571,431 | 11/1996 | Lantieri et al. | 219/130.01 |

OTHER PUBLICATIONS

Patent Abstracts of Japan; vol. 5, No. 18 (M–053), Feb. 3, 1981; Publication Number 55147496; Publication Date Nov. 17, 1980.

Brochure re: VERAWELD, computer controlled, high deposition, multi–purpose, authomated welding system published by Vermaat Technics, Inc., Plam Coast, Florida, date unknown.

Brochure re: The LH Comet MK 2 welding system, publishing by LH and Associates (UK) LTD., United Kingdom, date unknown.

*Primary Examiner*—Clifford C. Shaw
*Attorney, Agent, or Firm*—Merchant & Gould

[57] ABSTRACT

A mobile automated pipeline welding and quality control system comprising a gas metal arc welding carriage and a weld data monitor and acquisition unit. The welding carriage carries a welding torch, wire feed device for feeding consumable wire to the torch, an oscillator for oscillating the torch and a motorized drive mechanism for moving the carriage about a weldment. A controller for the carriage includes digital control circuitry for dosed loop control of the drive, oscillator and wire feed devices. By default, the controller operates each device at one of a plurality of pre-programmed nominal speeds selected from a mode table. The controller is responsive to drive, oscillation and wire feed speed variation signals under the control of an operator, and varies the speed of each device within speed ranges which are selected to ensure compliance with welding specifications. The monitor has voltage and current transducers for measuring current and voltage at the welding torch. The controller supplies the monitor with speed data relating to the drive, oscillator and wire feed devices. All of this information can be displayed and recorded in the monitors memory. In addition, the monitor can compute and display the heat input into the weld based on the detected welding parameters. This information allows the operator to make minute adjustments during the welding process to ensure that a weld falls within specifications.

17 Claims, 7 Drawing Sheets

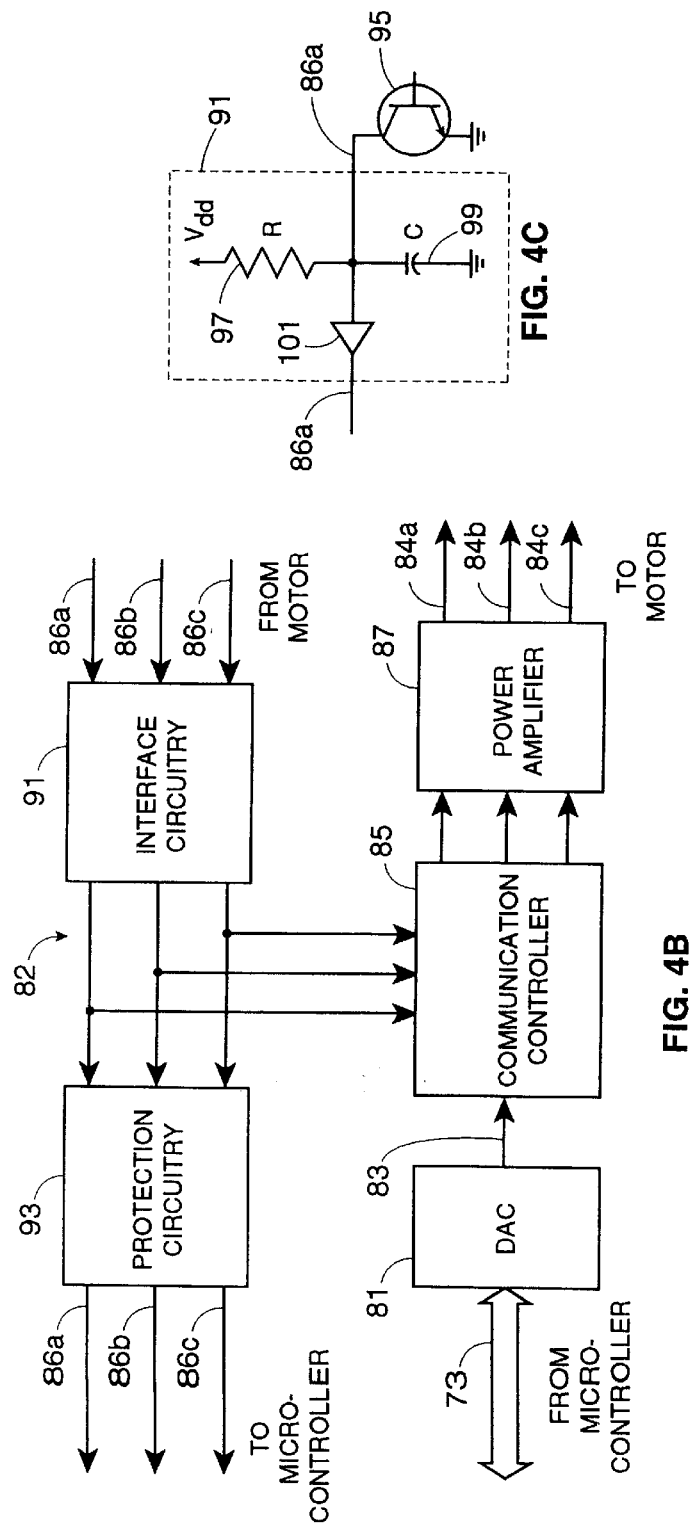

5,932,123

MOBILE AUTOMATED PIPELINE WELDING AND QUALITY CONTROL SYSTEM

FIELD OF INVENTION

The invention relates to the field of automated welding and quality control systems, and more particularly to a digital controller and associated weld data monitor and acquisition unit for a mobile gas metal arc welding carriage and the like.

BACKGROUND OF THE INVENTION

Pipelines, such as oil, water or sewer distribution or collections systems, are constructed by welding together a plurality of pipes, often at the installation site of the pipeline.

Known in the art are automated orbital pipeline welding systems, such as disclosed in U.S. Pat. No. 4,373,125, issued Feb. 8, 1983 to Kazlauskas. These automated systems are capable of forming accurate and strong welds on large diameter pipes. Such systems are relatively large, typically weighing over 500 kilograms, and are installed at a stationary location, such as an oil rig. Accordingly, such systems are not suitable for mobile field use.

More mobile welding systems are known. Typically, such systems comprise a welding carriage, or "bug" as often termed in the art, which includes a welding torch. The torch may be suited for Gas Metal Arc Welding (GMAW), Shielded Metal Arc Welding (SMAW) or Gas Tungsten Arc Welding (GTAW). The carriage is typically the size of a hand-held power tool and is mounted, via constrained rollers, on an annular rail or guide disposed on the weldment. The carriage includes a driving pinion which meshes with a toothed rack of the annular guide, thereby providing a means for guiding the carriage and torch around the weldment. Typically, the carriage has at least one d.c. brush type motor mounted thereon for driving the carriage on the guide as well as a motor for oscillating the torch. Typically too, the electronic control system for controlling the motors is housed in a separate unit, remote of the carriage, and linked thereto through a plurality of control cables.

There are various types of control systems for these types of bugs. One type of control system, based on analog electronics, employs potentiometers which are adjustable by an operator during the welding process. These potentiometers control the speed of the carriage drive mechanism motor, the torch oscillating motor, and, if present, a consumable electrode wire feed motor. Operators using such a system almost always adjust the speeds of the various motors during the welding process, particularly in order to avoid the problem of having the deposited weld bead, which is liquid, drip due to the influence of gravity. The problem with using such systems, however, is that welders have complete control of the welding process and can adjust the speeds of the motors such that the resulting weld does not always fall within the requisite specifications for the weld. The problem is further compounded by the fact that often the potentiometers are not linear.

Other known bug control systems employ largely digital control systems wherein, in combination with suitable carriages, many of the weld parameters can be pre-programmed. For example, one known type of mobile automated welding system allows the weld current, arc voltage, welding speed, oscillation speed, width and dwell time, torch height, tilt angle and annular position, to be digitally programmed. This system also provides a programmed means for controlling the carriage travel speed to deal with the deposited metal drip problems. Similar systems known in the art, such as disclosed in U.S. Pat. No. 5,534,676 issued Jul. 9, 1996 to Rinaldi et. al., have more sophisticated methods for accomplish this objective. However, one limitation common to these types of systems is a lack of flexibility in enabling the welder to vary the pre-programmed parameters during the welding process.

In any event, these mobile welding machines are often used in some of the harshest and most remote environments in the world. Thus, reliability of the machines is important. There are a number of limitations in the present design of mobile welding machines of the types described above that affect their reliability. Welding machines having the known fully automated digital control systems tend to have many sensors and other delicate mechanisms which are prone to breakage in use, particularly under heavy use in harsh construction environments. Welding machines having the analog control systems require frequent recalibration, particularly under operating conditions wherein the ambient temperature fluctuates widely. In addition, irrespective of the type of control system, brush-type motors mounted on the carriage have a tendency to burn out within a relatively short period of time. Moreover, the signals carried by such cables can be prone to electromagnetic interference caused by nearby operating machinery, particularly high frequency inverter type power sources which radiate relatively large amounts of electromagnetic energy.

In addition to having a reliable welding system, it is also important to ensure the quality of the resulting weld, particularly as the weld is being formed. Thus, it is desired to have a real time weld monitoring system. Some of the welding machines of the prior art having automated digital control systems provide a feedback to a remote computer indicating what the actual values of some of the carriage and welding parameters are. However, these systems do not inform the operator in real time whether the weld is being properly made. It would be helpful to have more comprehensive weld quality information readily available so that the operator could immediately adjust certain operating parameters to ensure the quality of the weld.

The present invention seeks to address many of the limitations of the prior art mobile pipeline welding systems described above.

SUMMARY OF THE INVENTION

In a first broad aspect of the present invention, there is provided a mobile welding machine having a carriage which carries a movable welding torch and a motorized travel mechanism for moving the carriage on a guide affixed to the weldment. Digital control circuitry is mounted on the carriage for operating the carriage travel motor at a programmed nominal speed. The circuitry is responsive to a drive speed variation signal under the control of the operator and varies the speed of the carriage travel motor within a predetermined speed range. The range is chosen such that the operator cannot weld outside of the limits of a welding specification yet still allows the operator some flexibility to avoid the deposited metal drip problems by adjusting the carriage drive speed.

A second broad aspect of the invention relates to a controller for a welding carriage which has mounted thereon a welding torch, a motorized drive mechanism, a motorized torch oscillation device, and a motorized wire feed device. The controller includes digital control circuitry for closed loop control of the drive, oscillator and wire feed motors. The digital control circuitry is connected to a memory which stores a table of operating modes for the drive, oscillator and wire feed devices. In each operating mode, a nominal speed for each of the drive, oscillator and wire feed devices is specified. A selector is provided for enabling an operator to select one of the operating modes. Once a particular operating mode has been selected and the motors activated, the digital control circuitry operates each device substantially at the corresponding nominal speed specified in a currently selected operating mode.

In a preferred embodiment according to the second broad aspect of the invention, invention, the controller is responsive to input signals ("speed variation signals") for varying the speed of the drive mechanism, and optionally the oscillator and wire feed devices. The speed variation signals are under the control of, and are adjustable by, the operator. The controller, however, only allows the speed of the corresponding device to be varied, preferably in a linear fashion, within a pre-specified speed range. The pre-specified speed range is preferably chosen such that the operator cannot perform a weld outside the limits of a welding specification. In another preferred embodiment, the operating mode table specifies, for each operating mode, a permissible speed range for each device. This, coupled with the programmable nature of the controller, as described in greater detail below, provides flexibility in accommodating a variety of welding specifications.

A third broad aspect of the invention relates to a weld data monitor and acquisition unit suitable for use with the above described welding carriage and associated controller. The weld monitor comprises a current detector for detecting welding current applied to the torch, a voltage detector for detecting welding voltage, and a travel speed detector for detecting the travel speed of the welding machine. The weld monitor also includes a memory, a micro-processor for successively recording the detected current, voltage and travel speed parameters in the memory, and means for specifying the recording interval of the parameters. A display displays one or more of the detected parameters in substantially real time.

In a preferred embodiment according to the third broad aspect of the invention, the controller provides signals to the weld monitor indicating the current drive, oscillator and wire feed speeds or rates for recordal by the monitor. In addition, the weld monitor is also capable of calculating and displaying the substantially instantaneous heat input into the weld, which is proportional to the electrical power applied to the torch divided by the travel speed. The heat input is often an important welding specification and providing such data to the operator during the welding process allows the operator to make the necessary adjustments while the weld is taking place to ensure that it remains within specifications.

In this preferred embodiment, the weld monitor may be provided with dual channels (i.e. two sets of detectors) for simultaneously tracking two welds performed by two welding carriages. The dual channel design of the monitor is advantageous because specifications for pipeline welding generally require the simultaneous use of two spaced apart welding carriages to perform a weld.

In this preferred embodiment, the weld monitor may include a communications port for enabling stored weld record data to be downloaded and analyzed off-line. Preferably, the weld record includes fields for identifying the particular weld, including geographical data for locating the weld when the pipe is buried underground, time base data, and associated welding parameter data. One particular off-line analysis which can be performed based on the weld records is a comparison, such as by a graphical plot, of heat input into the weld as a function of time (which indicates the location of the torch on the circumference of the pipe) against the limits of a welding specification. Such an analysis can identify whether a particular segment of the weld is not within specifications, even if the average heat input falls within the specification. In an alternative embodiment, the weld monitor includes a display interface for allowing such an analysis to be performed on-line.

A fourth broad aspect of the invention relates to the operative combination of the welding carriage, controller and weld data monitor which collectively form an integrated welding and quality control system. The synergy provided by the system includes the functionality of having the weld monitor record a weld and then being able to play back certain recorded data to the controller so as to "replicate" the earlier weld. In addition, the discrete design of the major components of the system ensures that if, for example, the weld monitor fails, such failure will not affect the functionality of the welding carriage and its controller.

BRIEF DESCRIPTION OF THE DRAWINGS

For the purposes of illustration and not of limitation, the present invention will be understood and appreciated more fully from the following detailed description, taken in conjunction with the following drawings, in which:

FIG. 4B is a system block diagram of servo control circuitry employed in the controller, in accordance with the preferred embodiment;

FIG. 4C is an electrical schematic diagram illustrating noise reduction circuitry employed in the servo control circuitry;

FIG. 5 is an illustration of a memory table specifying various controller operating modes;

DETAILED DESCRIPTION OF PREFERRED EMBODIMENTS

Figure 1:
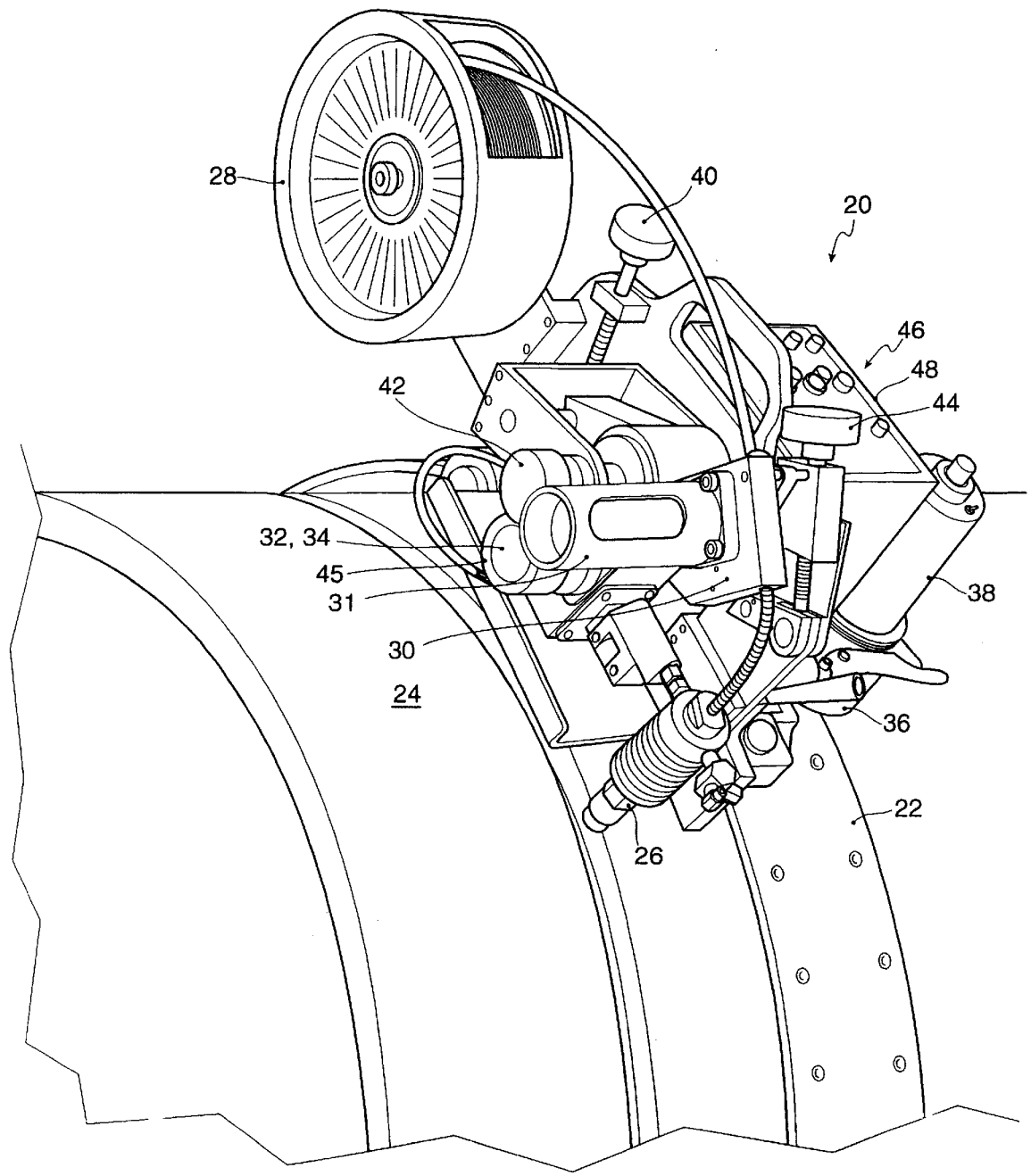
FIG. 1 is a perspective view of a welding carriage mounted on an annular guide disposed on a weldment.

FIG. 1 shows a carriage 20 mounted on an annular guide 22 which is installed over a weldment 24. The carriage and annular guide (but excluding a controller and motors which are discussed below) are commercially available from a number of vendors. For instance, the carriage illustrated in FIG. 1 is a model LH COMET MK2 available from L. H. and Associates Ltd. of Great Britain. Mechanically similar models of carriages are also available from CRC Evans of Tulsa, Okla., United States. Since these carriages are well known in the art, they shall be only briefly described.

Carriage 20 includes a movable welding torch 26 mounted thereon for applying weld metal and heat to a weld. A wire spool holder 28, which provides a supply of consumable metal, is also mounted on the carriage. The wire from the spool 28 is fed into a motorized wire feed device 30, employing a motor 31, and from there into an axial orifice in the torch. The carriage illustrated in FIG. 1 is designed for the GMAW welding process and thus the wire fed through the torch functions as a consumable electrode. The wire feed device 30 regulates the amount of wire delivered to the torch and consumed by the weld. In order to distribute the consumable electrode over the weld, a motorized oscillator 32, employing motor 34, is mounted on the carriage for oscillating the torch and thus the wire fed therethrough.

A motorized drive mechanism 36, employing a motor 38, is connected to the carriage 20 in order to drive the carriage 20 and torch 26 on the annular guide 22 about the weldment 24.

The illustrated carriage 20 also includes various controls for adjustment of various carriage welding parameters. These controls include a tip angle adjustment knob 40 for varying the angle at which the torch approaches the weld (which is not present on the CRC Evans machine); a tip horizontal adjustment knob 42 for varying the horizontal position of the welding torch with respect to the weld surface; and a tip vertical adjustment knob 44 for varying the vertical contact-to-work distance of the tip of the welding torch with respect to the surface of the weld. An oscillation width adjustment knob 45 varies the oscillation width of the torch. It will thus be seen that various welding parameters associated with the carriage, such as the positioning of the torch on the carriage, are mechanically controlled and manually adjustable whereas other welding parameters such as wire feed, travel speed and oscillation rate are electromechanically controlled. These latter welding parameters are controlled by an electromechanical control system (hereinafter "controller") 46 which is housed in a metal housing 48 mounted on the carriage 20 that is constructed to shield the controller from electromagnetic interference as much as possible. The controller 46 is described in greater detail below.

Figure 2:
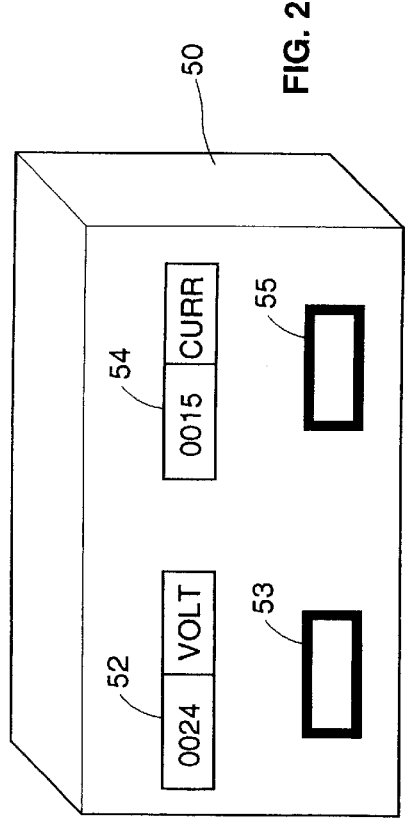
FIG. 2 is a perspective view of a dual channel weld data monitor and acquisition unit in accordance with the preferred embodiment of the invention.

FIG. 2 shows a dual channel data monitor and acquisition unit 50. The monitor 50 includes two display panels 52 and 54, each of which is designed to show a welding parameter and its associated numerical value. The preferred embodiment of the monitor, as described in greater detail below, is capable of monitoring and displaying welding voltage, current, carriage travel speed, torch oscillation rate, wire feed rate and heat input into the weld. Pushbuttons 53 and 55 enable an operator to cycle through or otherwise display other welding parameters being monitored by the respective monitor channel. The dual channel design of monitor 50 is particularly advantageous because specifications for pipeline welding generally require the simultaneous use of two welding carriages mounted on the guide and spaced 180 degrees apart to perform a weld. Thus, the monitor 50 enables an inspector or operator to view welding data pertaining to both carriages with a single monitor unit.

Figure 3:
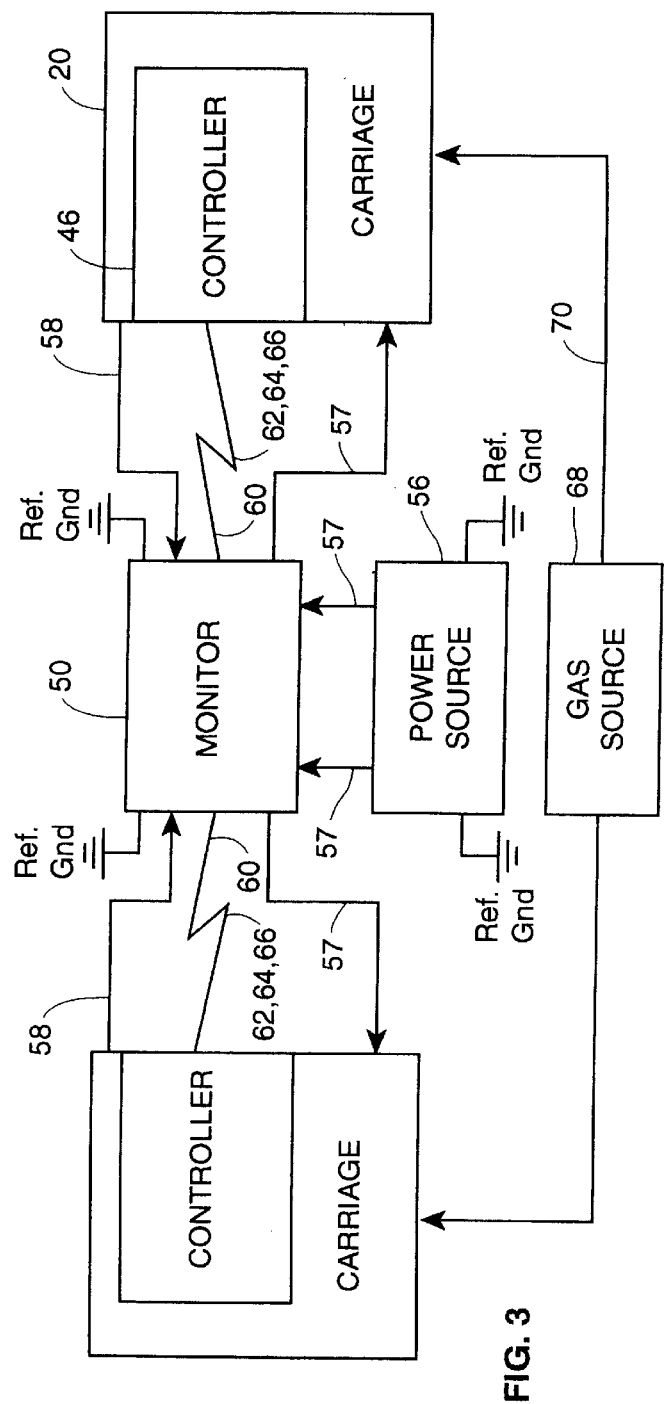
FIG. 3 is a schematic block diagram showing two welding carriages connected to the weld data monitor and power and gas sources in accordance with the preferred embodiment.

The system block diagram of FIG. 3 shows the preferred welding system of the invention wherein two carriages 20 are connected to external devices in preparation for welding and the monitor 50 is connected to these components so as to monitor a weld. In what follows, the system will be described with respect to only one carriage, it being understood that the other carriage and the interface of the monitor thereto functions identically.

The monitor 50, as described in greater detail below, includes current and voltage transducers for measuring the current and voltage supplied by a welding power source 56. For each carriage, a conductor 57 connects the power source 56 to the monitor for measurement of current. The conductor 57 exits the monitor 50 and is connected to the torch 26 mounted on the carriage. A wire 58, termed the "voltage tip sense", connects the tip of the torch 26 to the monitor 50 for measurement of voltage. Preferably, the power source 56 and monitor 50 are grounded to a common reference point, such as the weldment 24.

The monitor 50 is also connected to the controller 46 mounted on the carriage 20 via a bi-directional digital data link 60, which carries or transmits a travel speed signal 62, an oscillation rate signal 64, and a wire feed rate signal 66. These signals provide data relating to the current drive, oscillator and wire feed speeds or rates for recordal by the monitor. The torch 26 mounted on carriage 20 is also connected to a welding gas source 68 via a gas line 70.

Figure 4A:
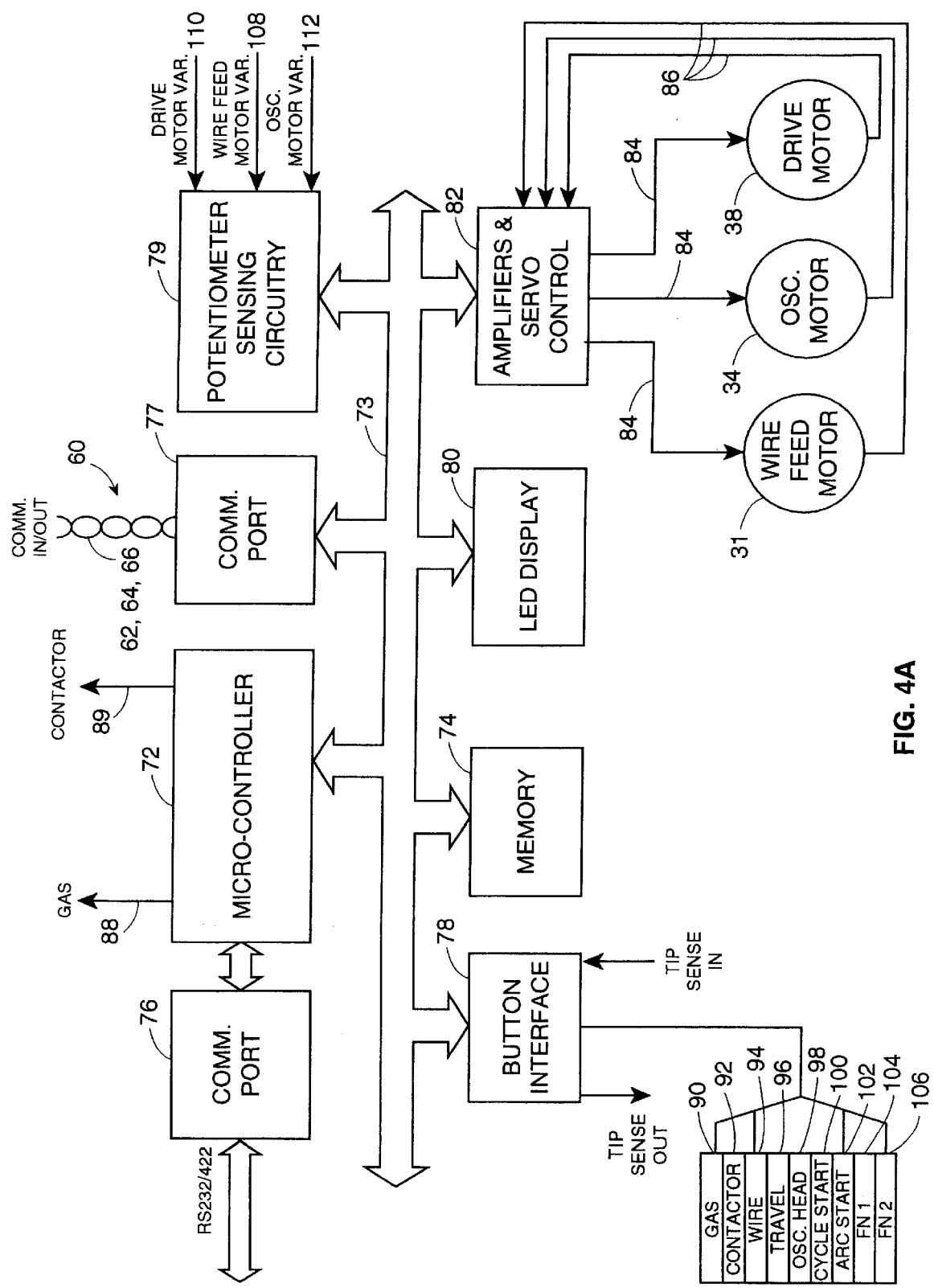
FIG. 4A is a system block diagram of a digital controller, in accordance with the preferred embodiment, used to control the welding carriage.

Referring additionally to FIG. 4A, the controller 46 is described in greater detail. The controller 46 comprises a micro-controller (including an interrupt controller) 72 which, through a digital bus 73, interfaces with a memory 74, a first communications port 76 (which is built into the micro-controller); a second communications port 77, a push button routing board 78, an LED display 80, and servo control circuitry 82. (Interrupt control connections are not shown in FIG. 4.) Communications port 77 is linked to the monitor 50 via data link 60 which in the preferred embodiment is a twisted pair line.

The push button routing board 78 holds and organizes a variety of push buttons, including POWER, OFF, GAS (90), CONTACTOR (92), WIRE (94), TRAVEL (96), OSC. HEAD (98), CYCLE START (100), ARC START (102), FN 1 (104), and FN 2 (106) push buttons. In the preferred embodiment, each of the pushbuttons is electrically connected to the micro-controller which polls the buttons to see if one or more are engaged or disengaged. It will be understood that numerous other methods known in the art can be used for alerting the micro-controller as to the depression of a button.

The micro-controller 72 controls a number of signals which are associated with the various push buttons. For instance, when the GAS push button 90 is engaged, the micro-controller activates a gas signal line 88 associated with a solenoid (not shown) in the gas source 68 which enables the flow of welding gas therefrom. Similarly, the CONTACTOR button 92 controls a contactor signal line 89 associated with a switch (not shown) which enables power flow from the power source 56.

The WIRE, TRAVEL and OSC. HEAD buttons 94, 96 and 98 respectively activate the wire feed motor 31, drive motor 38 and oscillator motor 34. While any of these buttons are pressed, the micro-controller 72 will display the corresponding motor's speed on the display 80.

The CYCLE START button 100 actuates the drive motor 38, activates the gas signal line 88 and activates the contactor switch. The ARC START button 102 activates the wire feed motor 31 and the oscillator motor 34. The FN 1 and FN 2 buttons 104 and 106 select various operating modes for the controller 46 as discussed below. It will thus be seen that an operator would, using the FN buttons, select the operating mode of the controller, engage the CYCLE START button 100 and then the ARC START button 102 in order to begin a welding pass.

The servo control circuitry 82 is connected to and controls drive motor 38, oscillator motor 34 and wire feed motor 31. In the preferred embodiment, each of these motors is a brushless d.c. motor, available from a number of manufacturers, which tends to have a much higher rated operating life than a comparable brush-type motor used in prior art welding carriages. Each motor is driven by three motor drive phase signals 84, and motor position feedback sensors such as three Hall effect signals 86 provide feedback for commutation and velocity control of the motor. The servo control circuitry, in conjunction with the micro-controller 72, implements a closed loop control strategy, such as a proportional integral ("p.i.") control loop, for controlling each motor. Preferably, the p.i. control loop implements a control law such as the well known law that power be supplied to the motor in order to minimize the velocity error thereof.

FIG. 4B shows the servo control circuitry 82 for one motor in greater detail. Circuitry 82 includes a digital to analog converter 81 which receives a digital power command from the micro-controller over the bus 73 and converts this into an analog power signal 83. The analog power signal is fed to a commutation controller 85, as is known in the art per se, which produces the three motor drive phase signals 84 (each phase being separately shown and labelled in FIG. 4B as 84a, 84b and 84c). The motor drive phase signals are amplified by a power amplifier 87 and connected to the corresponding motor.

Returning from the motor, the Hall effect signals 86 (each phase being separately shown and labelled in FIG. 4B as 86a, 86b and 86c) are routed through interface circuitry 91, described below, back to the commutation controller 85 for commutation control, and also to the micro-controller 72, via protection circuitry 93, for calculation of the motor's velocity.

The interface circuitry 91 is used to transmit the Hall effect signals back to the micro-controller 72 without undue interference from electromagnetic noise generated by the power lines to the carriage or from nearby high frequency inverter type power sources. FIG. 4C details the interface circuitry (91a) with reference to a given phase (86a) of Hall effect signal 86. The interface circuitry is mounted as close as possible to the motor so that the wire leading from a Hall effect device 95 (mounted in the motor) to the circuitry 91 is kept short in order to minimize susceptibility to noise. The circuitry 91 includes a pull-up resistor 97 which is electrically connected to the open collector of the Hall effect device 95. A capacitor 99 also filters the signal emanating from the collector of the device 95, which is coupled to a low output impedance buffer 101. The low impedance of the buffer 101 renders the return line to the micro-controller 72 relatively immune to voltage fluctuations caused by the electromagnetic noise.

The memory 74, shown in FIG. 4A, stores a variety of operating parameters and operating status or feedback data. The operating parameters include data such as a motor operating mode table, which is discussed in greater detail below, and a "gearbox ratio" associated with each motor so that the velocity thereof can be readily matched to control the particular mechanism the motor is connected to and the unique gearing thereof. Other operating parameters include a programmable wire feed stop delay, and programmable dynamic braking data.

The operating status data includes variables such as the actual speed of each motor, system diagnostics, and other operating parameters of the various controlled devices. While the carriage motors are operating, the micro-controller 72 updates such status data and continuously communicates the drive speed, wire feed rate and oscillation rate to communication port 77 which, in turn, transmits such information via signals 62, 64 and 66, respectively, to the monitor 50. In practice, these signals are multi-plexed and transmitted by communication port 77 over data link 60. Preferably, an RS-485 differential signalling protocol is used to transmit the data for immunity against electromagnetic noise interference.

In the preferred embodiment, the micro-controller 72 monitors the communications ports 76 and 77 for commands sent to it by the monitor 50 or any external computer according to a specified communications protocol. In the absence of any such commands, the controller 46 operates in (a) a default control mode wherein the micro-controller 72 is responsive to the various push buttons 90-106 and controls the motors in a pre-programmed manner, as described in greater detail below. However, the monitor 50 or any other external computer can set the controller 46 to (b) a flow-through control mode wherein essentially all of the components that the microcontroller is capable of controlling are controlled by the external computer; or (c) an administration control mode wherein various operating parameters of the controller can be externally read or set.

In the default control mode, the micro-controller 72, in conjunction with the servo control circuitry 82, operates each motor at a pre-programmed nominal speed. As shown in FIG. 5, the memory 74 retains a table of motor operating modes wherein, for each operating mode, the nominal speed and direction (not shown) of each motor is specified. The operator can select the operating mode, but, other than described below, cannot independently set the speed of each motor.

The table also includes a permissible speed range for each motor. In the preferred embodiment, each motor is associated with a potentiometer mounted on the carriage. These potentiometers provide signals, i.e., a wire feed speed variation signal 108, a drive speed variation signal 110, and an oscillation speed variation signal 112, which are connected to the micro-controller 72 via potentiometer sensing circuitry 79. The potentiometers allow an operator to adjust the speed of a given motor by a specified percentage of the nominal speed. For instance, in the table illustrated in FIG. 5, in mode 00 the speed of the drive motor may be adjusted to +/-10% of the nominal speed and the oscillator motor may be adjusted to +/-5% of the nominal speed. In the preferred embodiment, the micro-controller 72 implements a linear control relationship such that the degree of rotation of the potentiometer is linearly proportional to the speed variation of the corresponding motor within the specified speed range.

Once the table has been programmed, an operator can select the desired mode by engaging the function buttons 104 and 106. In this manner the controller 46 can be advantageously pre-programmed for a variety of welding specifications, such as the "hot" pass, "fill" pass and "cap" pass typically performed when welding pipe or portions thereof. The appropriate mode is easily selectable by the operator even during welding. Moreover, the controller ensures that once a mode has been selected, the operator cannot adjust the speed of the carriage motors outside of the pre-determined welding specifications associated with that mode.

In the administration control mode, any entry in the mode table can be read or set. In addition, any of the operating parameters such as the gearbox ratio of any motor can be read or set. Any of the operating status data stored in memory 74 can also be read. It will be appreciated that any logical communication protocol used for such purposes is application specific.

In the flow-through control mode, the micro-controller 72 does not respond to push-button requests and is essentially operated as a slave device to pass motor speed instructions to the servo control circuitry 82. In this manner, the controller 46 remains flexible to performing unique welds.

Figure 6:
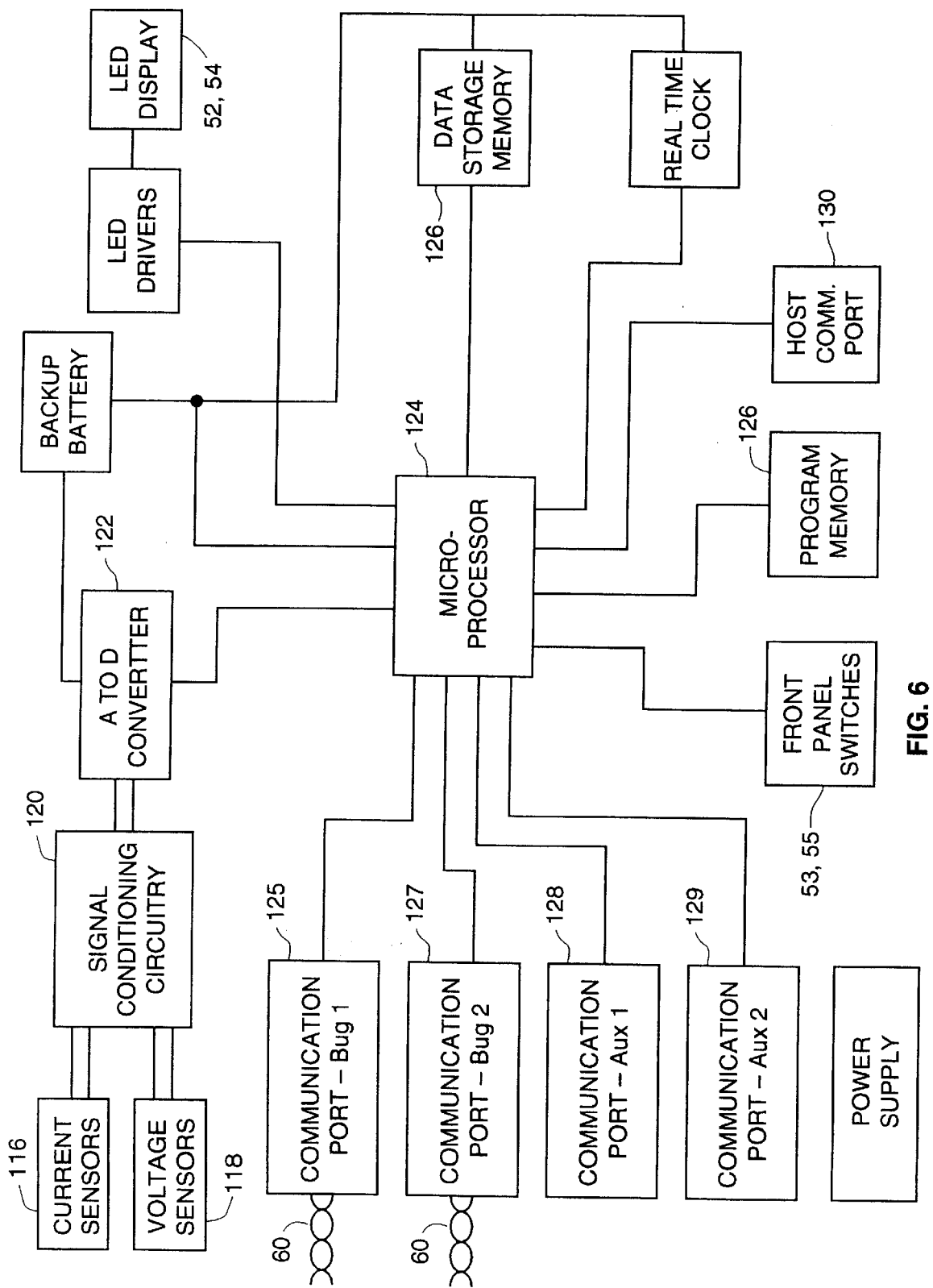
FIG. 6 is a system block diagram of the weld monitor, in accordance with the preferred embodiment.

The monitor 50 is shown in greater detail in the block diagram of FIG. 6. The monitor comprises current sensors 116 and voltage sensors 118. Signal conditioning circuitry 120 measures the instantaneous values of the detected current and voltage and an analog to digital converter 122 provide the current and voltage values in digital form to a microprocessor 124 which calculates the root mean square ("RMS") values thereof. The monitor includes a relatively large memory 126 for storing data and a program, described in greater detail below, which runs on the microprocessor 124. The monitor also includes five communication ports 125, 127, 128, 129 and 130. Ports 125 and 127 are connected to two controllers 46 and function to continuously receive the drive speed, wire feed rate and oscillation rates from two welding carriages over data links 60. Ports 128 and 129 are for communication with remote devices used to transfer weld identification data in order to physically correlate welding parameter data collected by the monitor with a particular pipe segment. Port 130 is used for communication with a host computer for downloading data or receiving commands therefrom.

Figure 7:
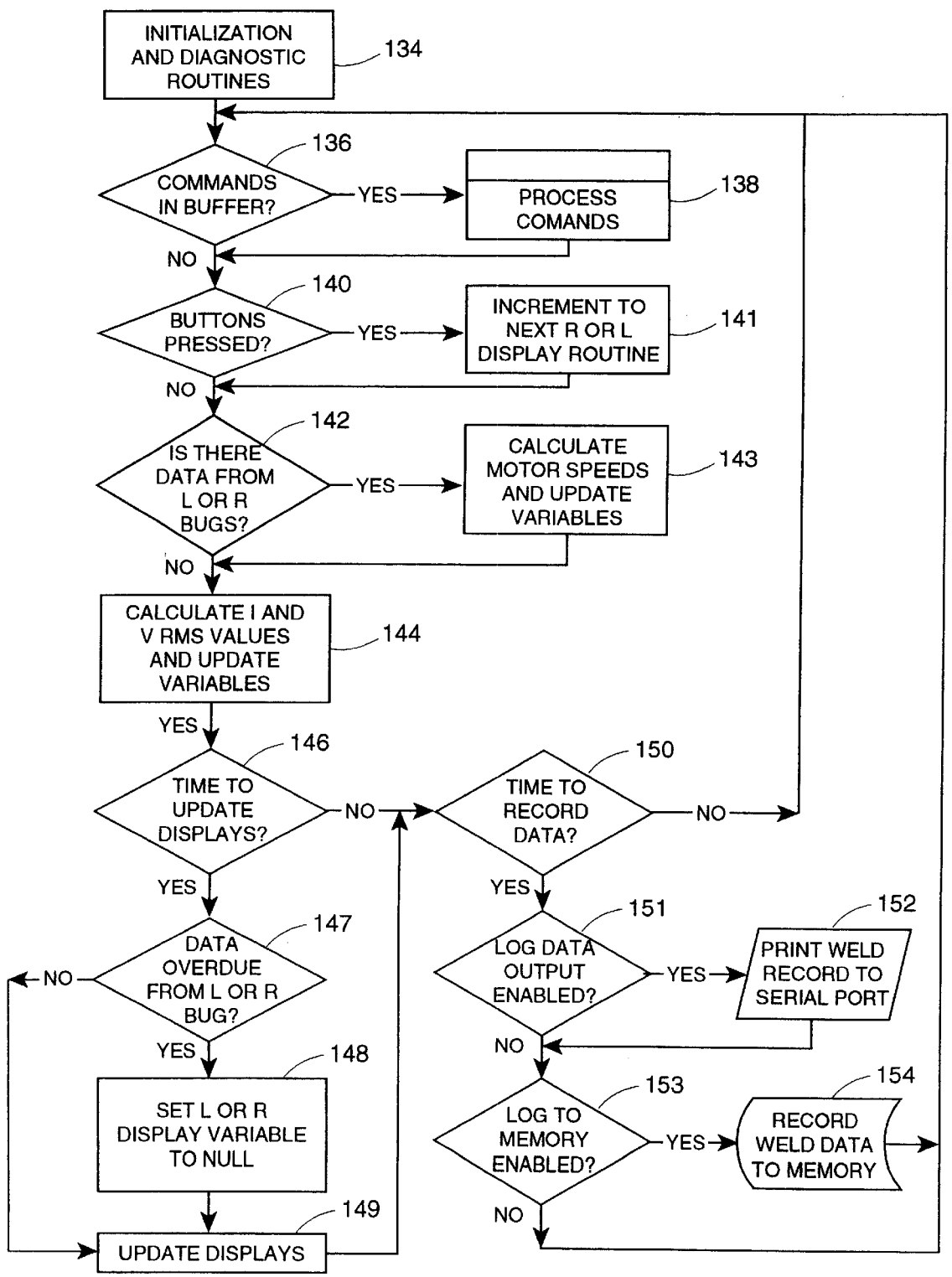
FIG. 7 is a flow chart of a software program executing on the weld data monitor in accordance with the preferred embodiment.

The main loop of the program running on microprocessor 124 is shown in FIG. 7. At a processing step 134, the monitor is initialized and diagnostic routines are performed. At a processing step 136, the microprocessor 124 checks to see whether any commands have been received from an external computer via the communication ports 128 and 130. If so, these commands are processed at a processing step 138.

At processing steps 140 and 141, the information shown in display 52 or 54 is changed if the corresponding monitor button 53 and 55 has been engaged by the operator. Preferably, each monitor channel monitor displays, at any one time, the welding voltage (V), welding current (I), carriage travel speed (S), torch oscillation rate, wire feed rate and instantaneous heat input into the weld. The instantaneous heat input is calculated as (V)*(I)*60/(S) and represents one of the important parameters in a welding specification. This data is available in real time to the operator who can make small adjustments to the carriage drive speed or other welding parameters to ensure that a weld remains within the heat input specification.

At processing steps 142 and 143, the microprocessor 124 checks if any new information (i.e. drive speed, wire feed rate and oscillation rate) is provided by signals 62, 64 and 66. If so, then the respective data variables maintaining such information are updated. At a processing step 144, the voltage and current measured by sensors 116 and 118 is converted into root mean square values ("RMS") and the respective data variables are updated.

At processing steps 146, 147, 148 and 149, the monitor displays are updated according to the most recently compiled information. A timer (not shown) is programmed to flag a variable whenever a specified time period has elapsed, and the microprocessor tests this variable for purposes of updating the display.

Similarly, a timer (not shown) is programmed to alert the microprocessor 124 that a specified time interval (typically in the range of 1–10 seconds) has elapsed and that it is time to record a weld record. In processing steps 150–154, the microprocessor determines whether the specified time interval has elapsed by testing a time variable, and, if the test is positive, a weld record is stored in memory and/or passed to the communication port for transmission to an external device such as a printer, or other peripheral.

Figure 8:
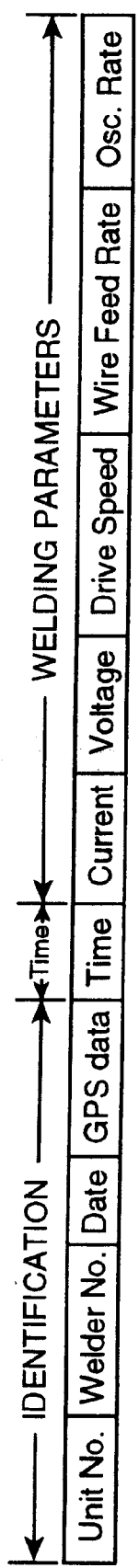
FIG. 8 (located on the same sheet of drawings as FIG. 5) is a pictorial representation of a weld data record recorded by the weld data monitor in accordance with the preferred embodiment.

A preferred format for the weld record is shown in FIG. 8. The record comprises fields for identifying the particular weld, time base data, and welding parameter data. Preferably the identification data includes geographical data obtained from a Global Positioning System ("GPS") device (and communicated through communication port 128 or 129) so that the weld can be physically located by personnel even when the pipe is buried in the ground.

Various commands can be transmitted to the monitor via the communication ports. In practice, a user specified protocol is employed for identifying such commands. In the preferred embodiment, at least three basic commands can be processed at step 136, including Download, Read/Write Parameter and Playback commands.

Figure 9:
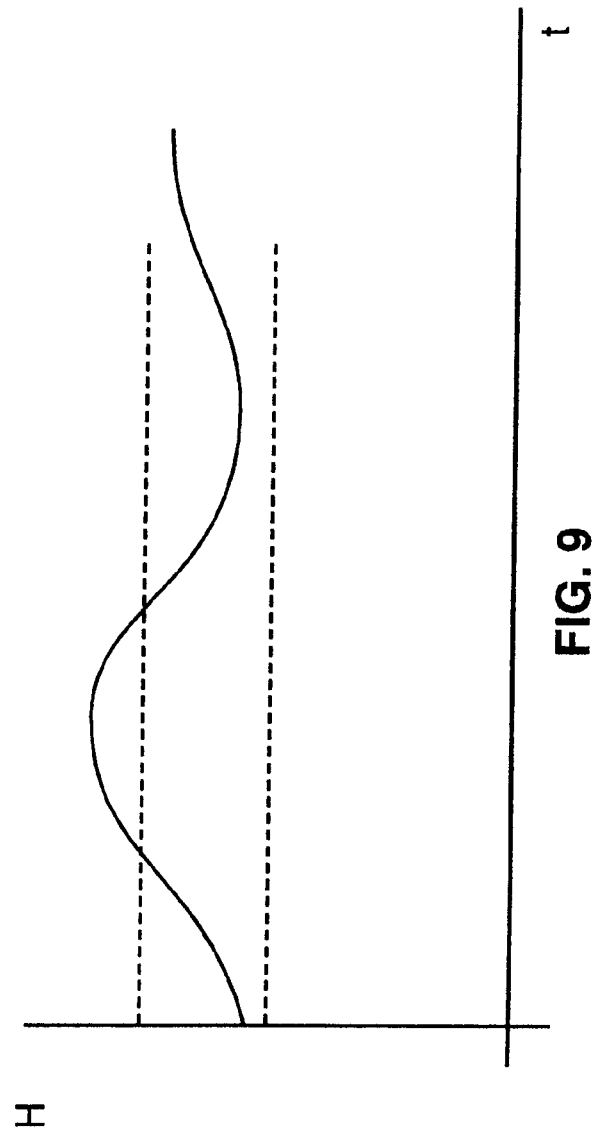
FIG. 9 (also located on the same sheet of drawings as FIG. 5) is an example, in graph form, wherein the heat input of a weld is outside of specifications for portions of the weld.

The Download command causes the monitor to transfer all or a selected group of weld data records stored in the memory 126 to communication port 125 or 127 thereby enabling welding data to be stored and analyzed off-line. As the monitor records welding data in substantially real time, it is possible to plot any welding data field or combination of fields to ensure that a weld has been performed within the limits of a welding specification. For example, in FIG. 9, the heat input of a weld as a function of time is compared against specifications. Average values can also be computed. In FIG. 9, although the average value of the heat input may be within specifications, nonetheless segments of the weld were not within specification and this information may be important for quality control purposes. In alternative embodiments, the monitor 50 can include an RGB or monochrome display interface for enabling an operator to connect a display to the monitor and plot the welding data on location without having to download the data first.

The ReadWrite Parameter command allows certain operating parameters of the monitor to be set or read. For example, the interval between recording weld data records can be specified by an external device, and various identification data, such as the GPS information, can be modified.

The Playback command causes the monitor 50 to transmit certain recorded weld data to the controller 46 such as the speeds of the various carriage motors as a function of time. In this manner, the monitor 50 can place the controller 46 in the flow-through control mode to substantially duplicate a series of previously performed welds. Such a function is useful, for instance, when an operator has welded a pipe setting the controller to a plurality of motor operating modes at various locations along the circumference of a pipe, say in order to avoid deposited metal drip problems, and wishes to sequence similar welds on additional segments of pipeline. Moreover, in contemplated modifications to the preferred embodiment, the monitor may vary the pre-recorded speed commands sent to the controller in order to ensure a weld remains within the limits of a programmed welding specification stored in the memory.

Similarly, the monitor 50 can transmit voltage commands to a remote control power source in order to duplicate a previously recorded data set, and in the contemplated modification to the preferred embodiment, the monitor may vary the voltage commands sent to the remote power source in order to ensure a weld remains within the limits of the programmed welding specification.

It will be appreciated by persons skilled in the art that the present invention is not limited by what has been particularly shown and described herein. Although the invention has been described with a certain particularity, numerous modifications may be made while keeping within the spirit of the invention. For example, although reference has been made to the use of brushless motors, brush type motors may readily by used. Similarly, various types of electrical and logical communication protocols may be readily used for communicating amongst the various components of the invention. Also while reference has been made to the use of potentiometers for providing speed variation input signals to the digital control circuitry, it will be appreciated that numerous other known analogue or digital type mechanisms can be employed as input means.

We claim:

1. A welding machine, comprising:

a welding carriage;

a welding torch movably mounted on the carriage;

a motorized travel mechanism for moving the welding carriage about material to be welded; and a controller mounted on the welding carriage for control of the travel mechanism, the controller including a memory, the memory having stored therein a nominal speed for the travel mechanism and a pre-selected speed range therefor;

digital control circuitry, connected to the memory and travel mechanism motor, for closed loop control of the travel mechanism, wherein by default the digital control circuitry operates the travel motor to drive the travel mechanism at the nominal speed therefor stored in the memory, and first input means, operatively connected to the digital control circuitry and under the control of an operator, for generating a travel speed variation signal, wherein the digital control circuitry is responsive to the travel speed variation signal and varies the speed of the travel motor within the pre-selected travel speed range stored in the memory, the travel speed range being selected to ensure that the travel speed of the welding carriage is within the limits of a welding specification.

2. The welding machine according to claim 1, wherein the controller includes a communication port connected to the digital control circuitry and the nominal speed and pre-selected speed range of the travel mechanism are communicable to the memory via the communication port.

3. The welding machine according to claim 2, further comprising:

a motor driven oscillator, mounted on the welding carriage, for oscillating the welding torch, wherein the memory has stored therein a nominal oscillation rate for the torch and the digital control circuitry is connected to the memory and the oscillator motor for closed loop control of the oscillator, and wherein by default the digital control circuitry operates the oscillator motor to drive the oscillator at the nominal oscillation rate stored in the memory, and second input means, operatively connected to the digital control circuitry and under the control of an operator, for generating an oscillation rate variation signal, wherein the memory includes a pre-selected speed range for the oscillator and wherein the digital control circuitry is responsive to the oscillation rate variation signal and varies the speed of the oscillator within the pre-selected oscillation speed range stored in the memory, the oscillation speed range being selected to ensure that the oscillation rate of the torch is within the limits of the welding specification.

4. The welding machine according to claim 2, further comprising:

a motor driven wire feed device, mounted on the welding carriage, for feeding consumable welding metal to the welding torch, wherein the memory has stored therein a nominal rate of wire feed and the digital control circuitry is connected to the memory and the wire feed device motor for closed loop control of the wire feed device, and wherein by default the digital control circuitry operates the wire feed motor to drive the wire feed device at the nominal wire feed rate stored in the memory, and third input means, operatively connected to the digital control circuitry and under the control of an operator, for generating a wire feed rate variation signal, wherein the memory includes a pre-selected speed range for the wire feed device and wherein the digital control circuitry is responsive to the wire feed rate variation signal and varies the speed of the wire feed device within the pre-selected wire feed speed range stored in the memory, the wire feed speed range being selected to ensure that the wire feed rate is within the limits of the welding specification.

5. The welding machine according to claim 2, wherein the drive motor is a brushless motor having motor position feedback sensors and the digital control circuitry comprises:

a microprocessor for velocity control of the brushless motor;

a commutation controller connected to the microprocessor for commutation control of the brushless motor;

a power amplifier, connected to the commutation controller, for driving the brushless motor; and transmission means, connected to the brushless motor, for transmitting feedback signals from the motor position sensors to the commutation controller and the microprocessor in an electromagnetically noisy environment.

6. A controller for a welding carriage of the type that carries a movable welding torch, a motorized oscillator device for oscillating the torch, a motorized wire feed device for feeding consumable welding metal to the torch, and a motorized drive device for driving the carriage on a guide mounted to a weldment, the controller comprising:

a memory, the memory having stored therein a plurality of operating modes for the drive, oscillator and wire feed devices, wherein, for each operating mode, a nominal speed for each such device is specified:

a selector for enabling an operator to select one of the operating modes:

digital control circuitry operatively connected to each of the memory, the selector, and the motors of the drive, oscillator and wire feed devices, for closed loop control of the drive, oscillator and wire feed motors, wherein by default the digital control circuitry operates each of the drive, oscillator and wire feed devices substantially at the corresponding nominal speed therefor specified by a currently selected operating mode: and first input means, operatively connected to the digital control circuitry and under the control of an operator, for generating a travel speed variation signal, wherein the memory includes a pre-selected speed range for the drive device, and wherein the digital control circuitry is responsive to the travel speed variation signal and varies the speed of the drive device within the corresponding pre-selected speed range specified in the memory, the drive speed range being selected to ensure that the drive speed of the welding carriage is within the limits of a welding specification.

7. The controller according to claim 6 wherein a pre-selected speed range for the drive device is stored in the memory for each operating mode stored in the memory.

8. The controller according to claim 6, further including:

second input means, operatively connected to the digital control circuitry and under the control of an operator, for generating a wire feed speed variation signal, wherein the memory includes a pre-selected speed range for the wire feed device, and wherein the digital control circuitry responds to the digital control circuitry and varies the speed of the wire feed device within the corresponding permissible speed range specified in the memory, the wire feed speed range being selected to ensure that the welding torch has a wire feed rate that falls within the limits of the welding specification.

9. The controller according to claim 8 further including:

third input means, operatively connected to the digital control circuitry and under the control of an operator, for generating an oscillation speed variation signal, wherein the memory includes a pre-selected speed range for the oscillator device, and wherein the digital control circuitry is responsive to the oscillation speed variation signal and varies the speed of the oscillator device within the corresponding speed range specified in the memory, the oscillation speed range being selected to ensure that the welding torch has an oscillation speed that is within the limits of the welding specification.

10. The controller according to claim 9 further including a communications port operatively connected to the digital control circuitry for communication with a remote device, wherein the digital control circuitry is operative to compute the instantaneous speeds of the drive, oscillator and wire feed devices and transmit such information via the communication port to the remote device.

11. The controller according to claim 9 further including a communications port operatively connected to the digital control circuitry for communication with a remote device, wherein the controller can be placed by the remote device in one of: (a) an administration control mode for reading or setting of any operating mode or status parameters stored in the memory, and (b) a flow-through control mode wherein the digital control circuitry is operative to implement motor speed commands received by it in respect of any of the drive, oscillator or wire feed devices.

12. A welding system, comprising:

a welding carriage;

a welding torch movably mounted on the carriage;

a motorized travel mechanism for moving the welding carriage about material to be welded;

a controller mounted on the welding carriage for control of the travel mechanism, the controller including a first communications port, a memory, the memory having stored therein a nominal speed for the travel mechanism and a pre-selected speed range therefor;

digital control circuitry, operatively connected to the memory, the first communications port and the travel motor, for closed loop control of the travel mechanism, wherein by default the digital control circuitry operates the travel mechanism at the nominal speed therefor stored in the memory, and wherein the digital control circuitry is operative to compute the substantially instantaneous speed of the travel mechanism and transmit such information via the first communication port, and first input means, operatively connected to the digital control circuitry and under the control of an operator, for generating a travel speed variation signal, wherein the digital control circuitry is responsive to the travel speed variation signal and varies the speed of the travel mechanism within the pre-selected travel speed range stored in the memory, the travel speed range being selected to ensure that the travel speed of the welding carriage is within the limits of a welding specification; and a weld data monitor and acquisition unit for recording welding data, the weld data monitor and acquisition unit including a current detector for detecting welding current flowing through the welding torch, a voltage detector for detecting voltage at a tip of the torch, a second communication port, operatively connected to the first communication port of the digital control circuitry, for receiving information pertaining to the travel speed of the welding carriage, memory means for successively recording welding parameters selected from the group comprising the welding current, welding voltage and travel speed, the recording taking place at a respective recording interval for each of the welding parameters, means, operatively connected to the memory means, for specifying the recording interval of the welding parameters, and a display for displaying one or more of the welding parameters in substantially real time.

13. The welding system according to claim 12, wherein the weld data monitor is operative to calculate and display a value representing the substantially instantaneous heat input into a weld based on the detected welding current, welding voltage and travel speed.

14. The welding system according to claim 13, wherein the weld data monitor provides travel motor commands to the digital control circuitry via the first and second communication ports in order for the digital control circuitry to vary the speed of the welding carriage travel mechanism and ensure that the heat input into the weld is within the welding specifications.

15. The welding system according to claim 14, further including:

a remote controlled power source; and wherein the monitor is operatively connected to the power source, and provides voltage commands to the power source such that the heat input into the weld falls within the welding specifications.

16. The welding system according to claim 13, wherein the weld data monitor is operative to communicate with the digital control circuitry via the first and second communication ports so as to provide the digital control circuitry with travel motor speed commands in order to replicate a previously recorded weld.

17. A welding system according to claim 1, including:

such second input means, operatively connected to the digital control circuitry and under the control of the operator, for generating a wire feed speed variation signal;

third input means, operatively connected to the digital control circuitry and under the control of the operator, for generating an oscillation speed variation signal;

wherein the memory includes pre-selected speed ranges for the wire feed device and oscillator device, and wherein the digital control circuitry is responsive to the wire feed speed variation signal and the oscillation speed variation signal and respectively varies the speeds of the wire feed device and the oscillator device within the corresponding pre-selected speed ranges stored in the memory, the wire feed speed range and the oscillation speed range being selected to ensure that the wire feed rate to the welding torch and the oscillation rate thereof are within the limits of the welding specification.

* * * * *